(12) United States Patent
Kwon et al.

(10) Patent No.: US 9,016,553 B2
(45) Date of Patent: Apr. 28, 2015

(54) METHOD FOR WELDING A FLANGE TO A GUIDE THIMBLE TUBE IN NUCLEAR FUEL ASSEMBLY

(71) Applicant: Korea Nuclear Fuel Co., Ltd., Daejeon (KR)

(72) Inventors: Ki-jun Kwon, Daejeon (KR); Se-yong Shin, Daejeon (KR); Sang-pil Kong, Daejeon (KR); Hung-soon Chang, Daejeon (KR); Jeong-ho Kim, Daejeon (KR); Tae-hyung Na, Daejeon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 203 days.

(21) Appl. No.: 14/069,291

(22) Filed: Oct. 31, 2013

(65) Prior Publication Data

US 2014/0097229 A1    Apr. 10, 2014

Related U.S. Application Data

(60) Division of application No. 12/687,045, filed on Jan. 13, 2010, now Pat. No. 8,622,277, which is a continuation-in-part of application No. 11/466,546, filed on Aug. 23, 2006, now abandoned.

(30) Foreign Application Priority Data

Jun. 16, 2006    (KR) .................. 10-2006-0054402

(51) Int. Cl.
   B23K 5/22       (2006.01)
   B23K 9/028      (2006.01)
   B23K 31/02      (2006.01)
   (Continued)

(52) U.S. Cl.
   CPC .............. *G21C 21/02* (2013.01); *B23K 9/0286* (2013.01); *B23K 31/02* (2013.01); *B23K 33/006* (2013.01); *B23K 37/0235* (2013.01); *B23K 37/0247* (2013.01); *B23K 37/027* (2013.01); *B23K 37/0276* (2013.01); *B23K 37/0426* (2013.01); *B23K 37/0536* (2013.01); (Continued)

(58) Field of Classification Search
   USPC ............ 228/49.3, 45.5, 212; 219/60 A, 60 R, 219/61.1, 59.1
   See application file for complete search history.

(56) References Cited

U.S. PATENT DOCUMENTS

| 1,922,913 A | 8/1933 | Free et al. ................ 219/59.1 |
| 2,397,206 A | 3/1946 | Ryan |

(Continued)

FOREIGN PATENT DOCUMENTS

| JP | 60-56475 A | 4/1985 | |
| JP | 60145288 A | 7/1985 | ............ B23K 9/225 |

(Continued)

*Primary Examiner* — Devang R Patel
*Assistant Examiner* — Carlos Gamino
(74) *Attorney, Agent, or Firm* — Rabin & Berdo, P.C.

(57) ABSTRACT

Disclosed therein are an apparatus for and a method of welding a flange to a guide thimble tube in a nuclear fuel assembly. The automatic welding apparatus includes a welding unit located on an axially conveying line of a tube for welding a surface of the tube inserted thereinto and a surface of a flange, a flange supplying unit for supplying the flange at a tube inlet of the welding unit onto the axially conveying line, and a conveying unit mounted on the axially conveying line in such a way as to move the tube and the flange on the axially conveying line, so that they are inserted into and drawn from the welding unit.

3 Claims, 13 Drawing Sheets

(51) Int. Cl.
*B23K 11/00* (2006.01)
*G21C 21/02* (2006.01)
*B23K 33/00* (2006.01)
*B23K 37/02* (2006.01)
*B23K 37/04* (2006.01)
*B23K 37/053* (2006.01)
*G21C 3/326* (2006.01)

(52) U.S. Cl.
CPC ............ *B23K 2201/06* (2013.01); *G21C 3/326* (2013.01); *Y02E 30/38* (2013.01)

(56) References Cited

U.S. PATENT DOCUMENTS

| | | | |
|---|---|---|---|
| 2,463,907 A | 3/1949 | Risley et al. | |
| 3,000,516 A | 9/1961 | Dixon et al. | |
| 3,241,224 A | 3/1966 | Banister et al. | 29/429 |
| 3,255,336 A | 6/1966 | Purcell | 219/125.11 |
| 3,483,351 A | 12/1969 | Wood | 219/121.13 |
| 3,634,648 A | 1/1972 | Morris et al. | 219/60 A |
| 3,646,663 A | 3/1972 | Vidal | 228/125 |
| 3,679,856 A | 7/1972 | Gruber | 219/59.1 |
| 3,745,319 A | 7/1973 | Unigovsky et al. | 219/101 |
| 3,848,863 A | 11/1974 | Owen | 269/9 |
| 3,882,299 A | 5/1975 | Sciaky | 219/60 R |
| 3,913,819 A | 10/1975 | Hirose et al. | 228/4.1 |
| 4,405,075 A | 9/1983 | Roddy | 228/49.3 |
| 4,432,486 A | 2/1984 | Wascat | 228/49.2 |
| 4,588,872 A | 5/1986 | Bollinger et al. | |
| 4,605,151 A | 8/1986 | Brown | 228/2.3 |
| 4,620,079 A | 10/1986 | Allmann et al. | |
| 4,758,392 A | 7/1988 | Collins et al. | |
| 4,827,063 A | 5/1989 | Bökers et al. | |
| 4,907,732 A | 3/1990 | Jones | 228/44.5 |
| 5,044,825 A | 9/1991 | Kaldenbach | 405/166 |
| 5,180,550 A | 1/1993 | Nylund | |
| 5,200,143 A | 4/1993 | Johansson | |
| 5,498,849 A | 3/1996 | Isshiki et al. | 219/121.64 |
| 5,601,225 A | 2/1997 | Wood et al. | 228/9 |
| 5,620,208 A | 4/1997 | Kirkham | |
| 6,184,493 B1 | 2/2001 | Tsuchiya | 219/161 |
| 8,256,089 B2 | 9/2012 | Pionetti | 29/458 |
| 2004/0144759 A1 | 7/2004 | Cho et al. | |
| 2005/0084056 A1 | 4/2005 | Klarner et al. | |
| 2011/0030942 A1 | 2/2011 | Orgeron | 166/77.51 |

FOREIGN PATENT DOCUMENTS

| | | |
|---|---|---|
| JP | 4-162973 A | 6/1992 |
| JP | 2000-202689 A | 7/2000 |
| SU | 1311896 | 5/1987 |

METHOD FOR WELDING A FLANGE TO A GUIDE THIMBLE TUBE IN NUCLEAR FUEL ASSEMBLY

CROSS-REFERENCE TO RELATED APPLICATIONS

This application is a divisional application of U.S. Ser. No. 12/687,045 filed on Jan. 13, 2010, which is a continuation in part (CIP) application of U.S. Ser. No. 11/466,546 filed on Aug. 23, 2006, the disclosures of which are incorporated by reference herein. Also, this application claims priority under 35 USC §119 from Korea Patent Application No. 10-2006-0054402 filed on Jun. 16, 2006, the disclosure of which is incorporated by reference herein.

BACKGROUND OF THE INVENTION

1. Field of the Invention

The present invention relates to an apparatus for and a method of automatically welding a flange to a guide thimble tube in the manufacturing process for the guide thimble tube, which is a major element of a nuclear fuel assembly.

2. Background of the Related Art

A nuclear fuel assembly is an assembly of fuel elements that can be handled in one entity when loaded into and unloaded from a nuclear reactor. For example, a nuclear fuel assembly used for a light-water reactor (called a fuel assembly) is composed of a plurality of fuel rods (fuel elements) forming a bundle of a rectangular shape, at both ends of which a perforated support plate is disposed to pass coolant, and at the intermediate of which a support grid is mounted for the fuel rods to be spaced apart from each other. The individual fuel rod is formed of a hollow zicaloy tube having a length of about 4 mm, inside of which sintered uranium pellets are stacked. Typically, the fuel bundle for a boiling water reactor is formed of about 60 fuel rods and one for a pressurized water reactor is formed of about 230 fuel rods.

In such fuel assembly, a skeletal structure to which fuel rod is loaded is called a "fuel assembly skeleton." The fuel assembly skeleton is formed of an upper end fitting, a lower end fitting, a guide tube, an instrument tube, and so on. These components are connected to each other through a welding or other mechanical method. In the nuclear fuel assembly, the assembly skeleton functions to keep a gap between the individual fuel rods and hold them in place. The assembly skeleton forms a basic structure of the nuclear fuel assembly.

In the above assembly skeleton, the guide tube is an internal structure installed inside of a nuclear reactor for the purpose of guiding of smooth entry of the control rod. The starting, interrupting and output-controlling of a nuclear reactor are carried out by entering the control rod (a neutron absorber) into the reactor core. The guide tube has important roles in determining a proper location, forming a flow path to cool the fuel properly and so on, without damaging the integrity of the fuel assembly. In addition, the guide tube serves as a path for the poison rod, the nuclear source rod and so on, as well as the control rod.

Such a guide tube is fixed to under the upper end fitting and a control rod or the like is charged from the upper part of the reactor to enter the guide tube. The connection with the upper end fitting is carried out by a flange attached to one end of the guide. Thus, a flange must be attached to the guide tube.

The guide tube is structured such that its lower portion has a smaller inner diameter for various equipments charged from the upper part not to be damaged by impact when being dropped. This is to reduce the descending speed of the control rod. In addition, two flow holes are formed so that coolant water can be filled inside the guide tube.

The guide tube having the above-described structure had a sophisticated shape and thus it is very difficult to manufacture the guide tube in an automatic way. In addition, the guide tube plays a very important role in the nuclear reaction and thus must be manufactured with a great precision.

Therefore, since the welding of a flange or the like to the guide tube must be performed with a great precision, a manual manufacturing process has been carried out for the purpose of quality, which leads to a time consuming. However, considering the quantity of guide tubes to be manufactured, it must be considered a way of improving production efficiency.

A conventional welding method of connecting a flange to a guide tube is mostly performed manually. As previously mentioned, it is because the shape of the guide tube is not simple and thus an automatic welding is not easy. In particular, in order to weld a flange, as shown in FIGS. 1a and 1b, the guide tube and the flange are connected through an interference fit welding using manually-operated equipment.

Conventionally, as illustrated in FIG. 1a, a pressure-inserting step is formed in the flange 2 and thus as shown in FIG. 1b the pressure-inserting step is forcibly inserted into the tube 1. Then, a welding is carried out.

The above welding method requires a separate pressure-fitting process and forms an internal step during the pressure inserting, thereby necessitating a separate machining process. In addition, in case of manually working on a larger amount of guide tubes, there is a concern about diseases in the musculoskeletal systems, due to the tube length of about 4000 mm and weight of about 2.5 kg.

Furthermore, in terms of productivity and quality, the working time is extended and not consistent to degrade its production efficiency. In case of expediting the process in order to improve the productivity, the quality is degraded.

SUMMARY OF THE INVENTION

Therefore, the present invention has been made in view of the above problems in welding a flange to a guide thimble tube in the manufacturing process for the guide thimble tube, and it is an object of the present invention to provide an apparatus for and a method of automatically welding a flange to a guide thimble tube.

More specifically, it is another object of the invention to provide an apparatus for and a method of automatically welding a flange to a guide thimble tube, in which the flange welding employs a butt-welding mode as shown in FIGS. 9a and 9b, not an interference-fitting method, thereby achieving automation.

In addition, it is a further object of the invention to provide an apparatus for and a method of automatically welding a flange to a guide thimble tube, in which the transferring process is automated to enable to transfer a large amount of guide tubes without difficulty, thereby preventing diseases in the musculoskeletal systems, and the whole process is automated so as to be carried out through one operation to thereby improve productivity.

Furthermore, it is yet another object of the invention to provide an apparatus for and a method of automatically welding a flange to a guide thimble tube, in which each process performs a precision measurement to improve the productivity by automation and maintain quality, thereby preventing degradation in quality, which may be caused in attempt to improve productivity.

To accomplish the above object, according to the present invention, there is provided an apparatus for automatically welding a flange to a guide thimble for tube comprising: a welding unit located on an axially conveying line of a tube for welding a surface of the tube inserted thereinto and a surface of a flange; a flange supplying unit for supplying the flange at a tube inlet of the welding unit onto the axially conveying line; and a conveying unit mounted on the axially conveying line in such a way as to move the tube and the flange on the axially conveying line, so that they are inserted into and drawn from the welding unit.

The tube and the flange are processed to form a welded surface by either one end surface of the tube and the flange, which are in contact with each other, inserted into the other end surface of the flange and the tube.

The flange supplying unit comprises: a magazine vertically perforated, on which a plurality of the flanges are piled up; a stopper located beneath the magazine to discharge the flanges one by one; conveying blocks for seating the discharged flanges thereon; and a pneumatic cylinder for moving the conveying blocks in order to locate the flanges on the axially conveying line of the tube.

The welding unit comprises: a welding chamber to which the tube and the flange are inserted; a mandrel unit for fixing and rotating the flange and the tube inserted into the welding chamber; a chamber side sealing unit mounted on the mandrel unit at a tube inlet of the welding chamber, being in close contact with the outer circumferential surface of the tube inserted into the welding chamber to thereby shield the inside of the welding chamber from the outside; a welding torch group located on the surface of the tube and the flange for welding the surface; and a servo motor for rotating the mandrel unit by a belt connected with the mandrel unit.

The mandrel unit comprises: a pneumatic cylinder mounted around a mandrel inlet of the welding chamber; a mandrel introduced into or discharged from the welding chamber through the mandrel inlet for fixing and rotating the flange and the tube inserted into the welding chamber; and a connecting rod for connecting the mandrel and the pneumatic cylinder with each other to move the mandrel.

The mandrel further comprises a mandrel shaft connected to an end portion of the mandrel inside the welding chamber and inserted into the flange and into the tube, the mandrel shaft fixing the flange and tube.

The chamber side sealing unit comprises: a metal ring having through holes radially formed on the outer circumferential surface thereof; and an elastic ring joined to the inner circumferential surface of the metal ring, whereby gas injected to the outer circumferential surface of the metal ring flows into the through holes, so that the elastic ring expands in a central direction of the elastic ring by pneumatic pressure.

The welding torch group comprises: a welding torch for welding the surface of the tube and the flange; a pneumatic cylinder for providing a vertically moving force of the welding torch; and a connecting rod for connecting the welding torch with the pneumatic cylinder to thereby transfer a driving force of the pneumatic cylinder to the welding torch.

The conveying unit comprises: axially conveying unit respectively mounted on at least one axially conveying line to convey the tube onto an axially conveying line; and at least one laterally conveying unit for conveying the tube in a perpendicular direction to the axially conveying line.

The laterally conveying unit comprises: a cam unit having a motor mounted below the workbench, a cam connected to a driving shaft of the motor, and a slave body interlocking with the cam in a state where it is in contact with the cam by a roller; a conveyable body having a slave bar carrying out a vertical reciprocating action by the slave body, and blocks formed below the welding position tube fixing hole and the measuring position tube fixing hole and on the upper face of the slave bar correspondingly to the welding position tube fixing hole and the measuring position tube fixing hole of the tube guide, each of the blocks having an inclined upper face; and a tube guide unit having at least one tube guide being at right angles to the tube and aligned at regular intervals perpendicularly to the axially conveying line and at least one fixing shaft being parallel with the axially conveying line and arranged below the tube guide for fixing the tube guide.

The axially conveying unit comprises: a gripper joined with the upper portion of the body by a hinge and having right and left arms, the right and left arms being rotated on the hinge to hold and fix the tube; and a gripper conveying unit for conveying the gripper along the axially conveying line.

The automatic welding apparatus further comprises a tremor measuring part including: a tube rotator for rotating the tube to which the flange is welded; a probe being in contact with the outer surface of the rotating flange for inspecting changes in height of the outer surface of the flange according to the rotation of the tube; a stopper being rotated with the tube after stopping the axial conveyance of the tube below the probe; and a tube rotator for rotating the tube.

The automatic welding apparatus further comprises a stopper side sealing unit including: a sealing bar having a sealing ring mounted at an end thereof, the sealing bar being adapted to seal the inside of the tube from the outside by the sealing ring expanding after the sealing bar is inserted into the tube from an end portion of the tube exposed to the outside of the welding unit; and a driving means for moving the sealing bar along the axially conveying line of the tube.

In another aspect, to accomplish the above object, there is provided a method of automatically welding a flange to a guide thimble tube using an apparatus for automatically welding the flange to the guide thimble tube, which comprises: a welding unit having a mandrel unit and a welding torch group and mounted on one of two axially conveying lines of the tube; a flange supplying unit mounted at a tube inlet of the welding unit in such a way as to be located on the axially conveying line at a predetermined distance; a conveying unit for conveying the tube mounted on the upper portion in an axial direction or a lateral direction; and a controlling part for controlling the above components, the method comprising the steps of: supplying the flange onto the axially conveying line, on which the welding unit is located, by the flange supplying unit; conveying the tube toward the welding unit along the axially conveying line by the conveying unit, and inserting surfaces of the flange and the tube into the welding unit after the welded surfaces are formed by the tube interlockingly joined to the flange; welding the surfaces by the welding torch group when the mandrel unit rotates the flange and the tube after fixing them; drawing out an end portion of the tube, to which the flange is welded, from the inside of the welding unit; and laterally conveying the drawn-out tube.

Using the apparatus for automatically welding the flange to the guide thimble tube, which further comprises a chamber side sealing unit mounted on the welding unit and a stopper side sealing unit mounted on an end portion of the tube exposed to the outside of the welding unit, the automatic welding method further comprises the step of sealing the inside of the welding unit from the outside by the stopper side sealing unit and the chamber side sealing unit, which are in contact with the outer circumferential surface of the tube located inside the welding unit after the insertion step, and sealing the inside of the tube from the outside by the stopper side sealing unit at the end portion exposed to the outside of the welding unit.

Using the apparatus for automatically welding the flange to the guide thimble tube, which further comprises a tremor measuring part mounted on the axially conveying line in parallel, the automatic welding method further comprises the step of Measuring a vibration width of tremor of the flange by the tremor measuring part while the tube conveyed to the tremor measuring part by the conveying unit is rotated to thereby inspect whether or not the vibration width is within an error tolerance.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1A:
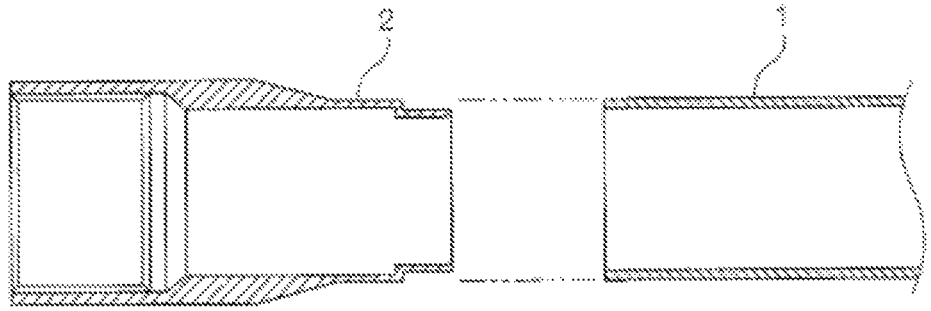
FIG. 1a is a sectional view showing a state before a tube and a flange are joined with each other according to a forcibly inserting type welding method.
Figure 1B:
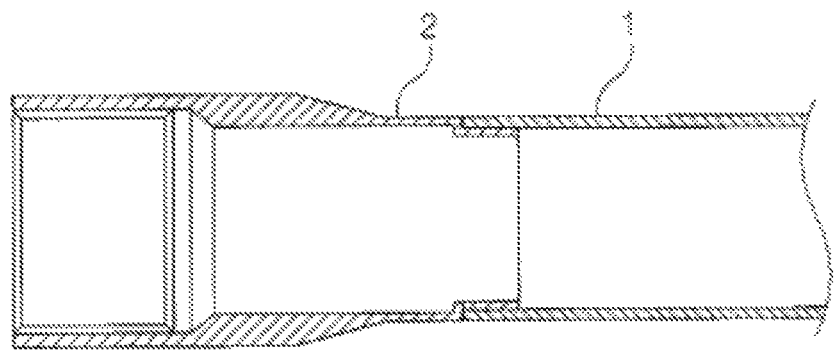
FIG. 1b is a sectional view showing a state after the tube and the flange are joined with each other according to the forcibly inserting type welding method.

Reference will be now made in detail to the preferred embodiment of the present invention with reference to the attached drawings.

If there is no specific definition and description, the terms used to indicate upper and lower directions and left and right directions are defined with reference to the attached drawings, and it is noted that unnecessary indications of sections in the drawings will be omitted in order to facilitate identification.

Figure 2A:
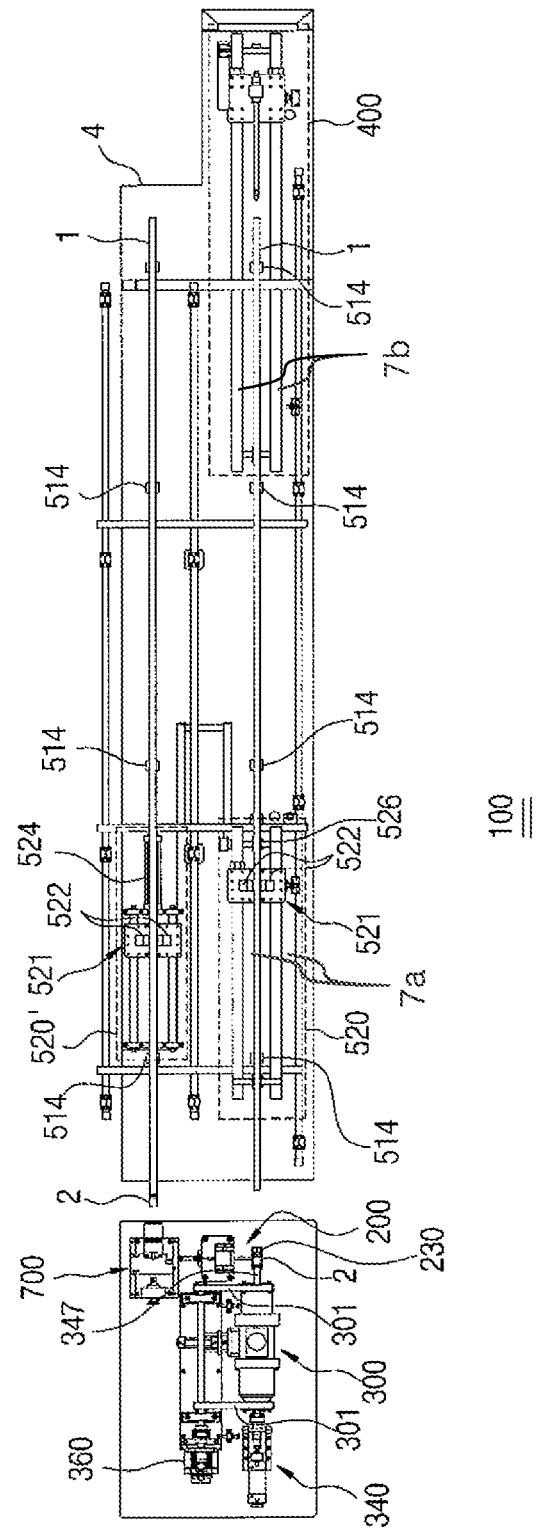
FIG. 2a is a top view of an apparatus for automatically welding a flange of a guide thimble tube.
Figure 2B:
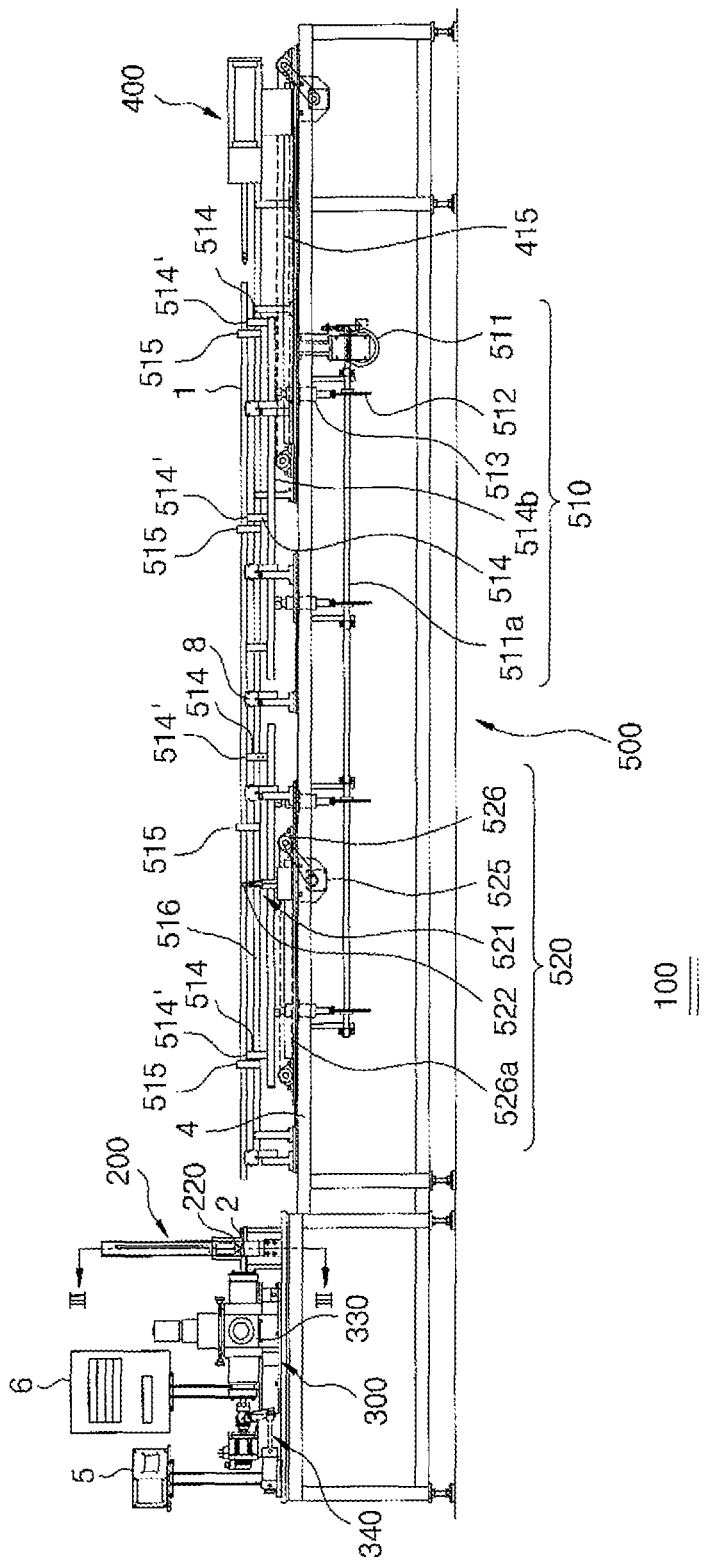
FIG. 2b is a front view of the apparatus for automatically welding the flange of the guide thimble tube.

FIG. 2a is a top view of an apparatus 100 for automatically welding a flange of a guide thimble tube, and FIG. 2b is a front view of the apparatus 100 for automatically welding the flange of the guide thimble tube.

As shown in FIGS. 2a and 2b, the apparatus 100 for automatically welding a flange of a guide thimble tube (hereinafter, called 'automatic welding apparatus') includes a flange supplying unit 200 mounted on a workbench 4, a welding unit 300, a stopper side sealing unit 400, a conveying unit 500, a tremor measuring part 700, an indication part 5, and a controlling part 6.

In the automatic welding apparatus 100, as shown in FIGS. 2a and 2b, the conveying unit 500 is located between the welding unit 300 and the sealing unit 400. The flange supplying unit 200 is configured to be biased from a tube inlet 334 (see FIG. 4) of the welding unit 300 toward one side on an axial conveying line of a tube 1. Moreover, the tremor measuring part 700 is located biasedly in a lateral conveying direction of the tube 1 of the flange supplying unit 200. The tube 1 is seated on the upper portion of a tube conveying roller 8 and conveyed along the axial conveying lines 7a and 7b. While the tube 1 is conveyed along the axial conveying lines, the flange 2 is welded thereon and tremor is measured. Reference numerals unexplained in FIGS. 2a and 2b will be described together with detailed descriptions of the following components.

Not shown in the drawings, but a welded surface processing part (not shown) is aligned at one side of the welding unit 300 to automatically carry out a welding between the tube 1 and the flange 2, and an inner diameter processing part (not shown) is aligned at a laterally opposed side of the tube of the welding unit 300. In this instance, the conveying unit 500 may be aligned adjacently on the right of the welded surface processing part (not shown), the welding unit 300, the tremor measuring part 700 and the inner diameter processing part (not shown) in order to convey the tube 1 from one processing part to the other processing part, whereby the whole process for processing of the tube 1 can be carried out automatically.

Figure 3:
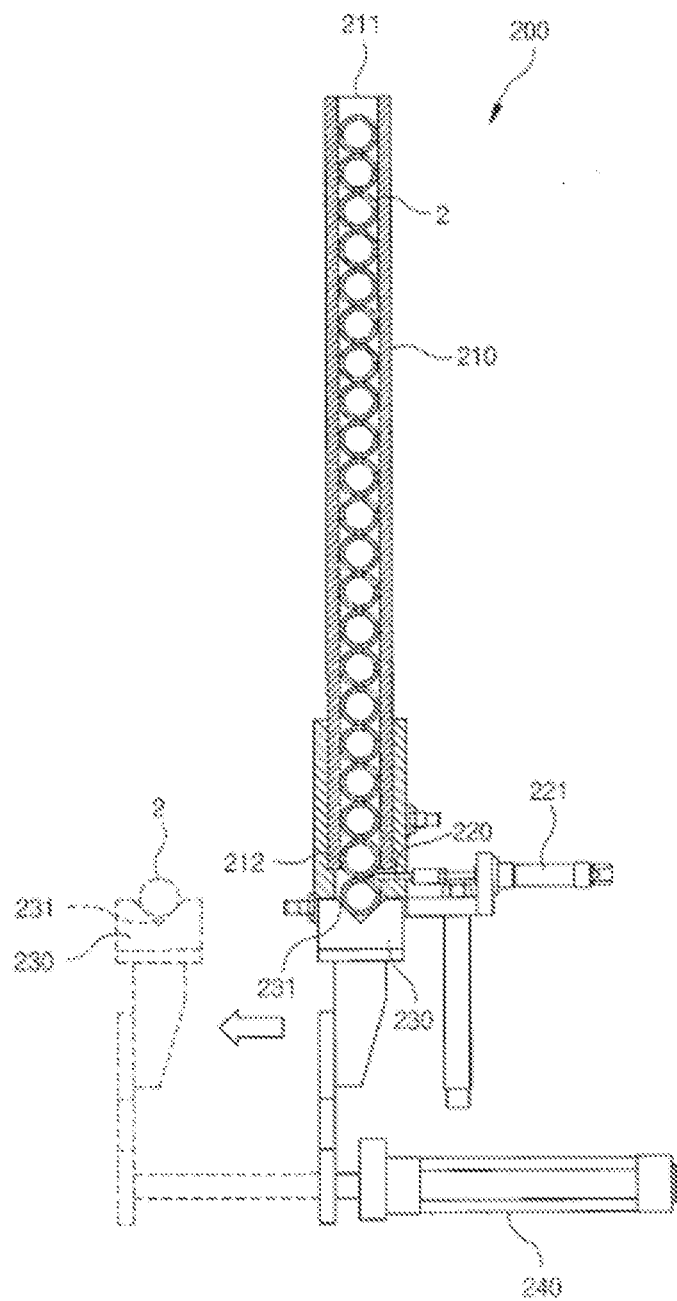
FIG. 3 is a partially sectional view of the flange supplying unit 200 taken along the line of III-III of FIG. 2b.

FIG. 3 is a partially sectional view of the flange supplying unit 200 taken along the line of III-III of FIG. 2b.

The flange supplying unit 200 is configured to automatically supply the flange 2 to be welded to the tube 1, and includes a magazine 210, a stopper 220, a flange conveying block 230, and a pneumatic cylinder 240.

The magazine 210 includes a flange inlet 211 formed at the upper portion thereof and a flange outlet 212 formed at the lower portion thereof, and hence, when the flanges 2 are charged from the upper portion of the magazine 210, they are discharged from the flange outlet 212 after being piled up in a line from the upper portion to the lower portion of the magazine 210.

Beneath the magazine 210, the stopper 220 stops the flange outlet 212, and it moves back and forth by the pneumatic cylinder 221 to open and close the flange outlet 212. Accordingly, the flanges 2 can come out one by one from the magazine 210 through a control of the pneumatic cylinder 221.

Below the stopper 220, the flange conveying block 230 having a wedge type hole 231 is located. The conveying block 230 accepts the flanges 2, which come out from the flange magazine 210 one by one by the stopper 220, into the wedge type hole 231.

The pneumatic cylinder 240 is connected to a lower end of the flange conveying block 230. The pneumatic cylinder 240 conveys the conveying block 230 accommodating the flanges 2 like a dotted line of FIG. 3 to thereby convey the flanges 2 onto the axial conveying line of the tube 1.

Figure 4A:
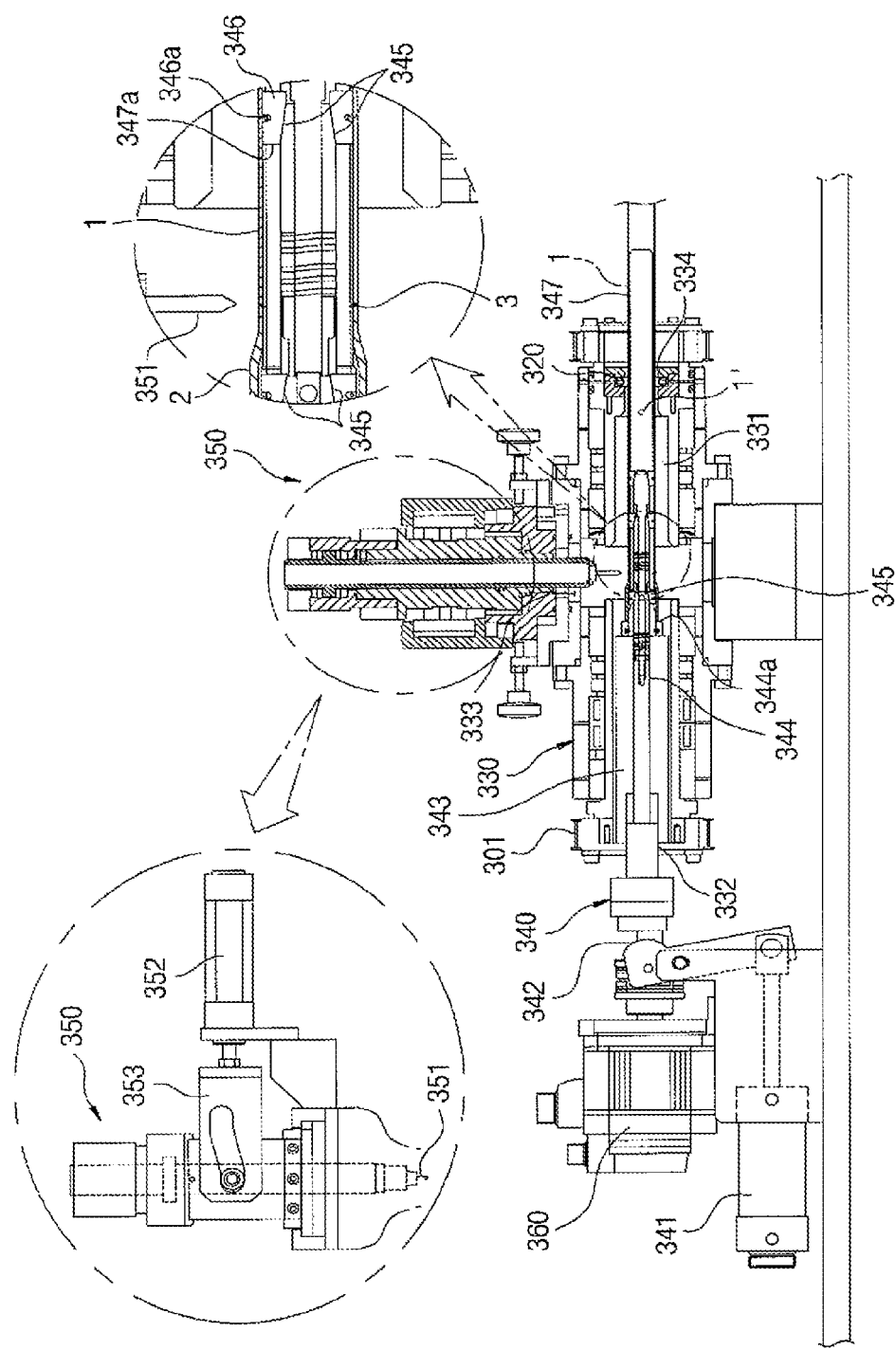
FIG. 4a is a sectional view of a welding unit 300.
Figure 4B:
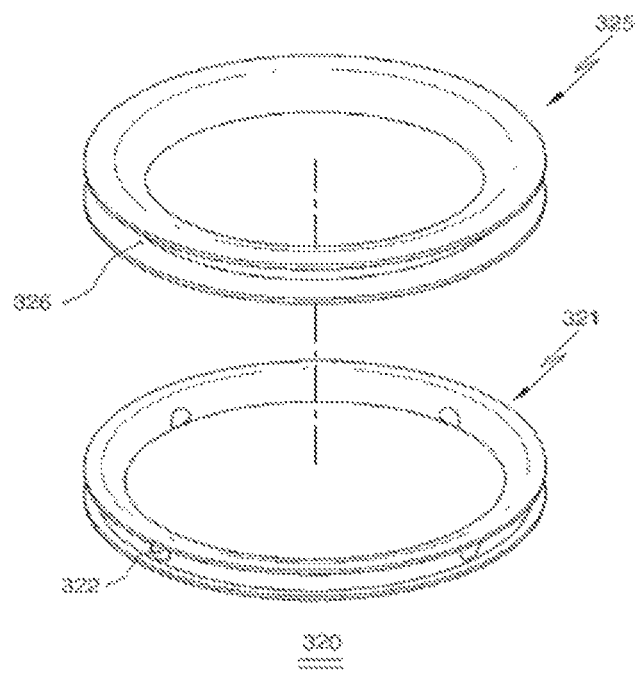
FIG. 4b is an exploded perspective view of a chamber side sealing unit 320.
Figure 4C:
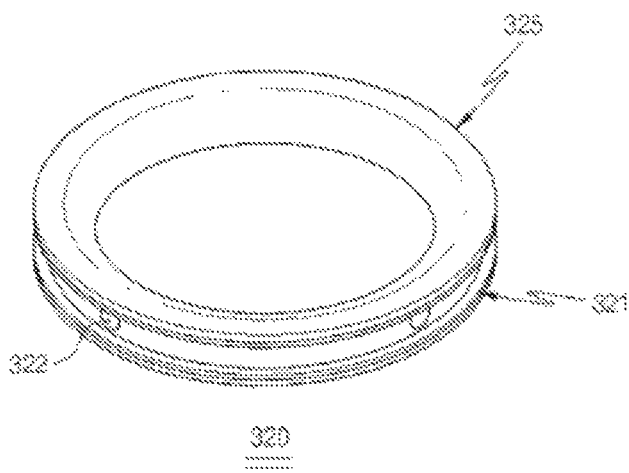
FIG. 4c is a perspective view of the chamber side sealing unit 320.

FIG. 4a is a sectional view of the welding unit 300, FIG. 4b is an exploded perspective view of a chamber side sealing unit 320, and FIG. 4c is a perspective view of the chamber side sealing unit 320.

The welding unit 300 includes the chamber side sealing unit 320, a welding chamber 330, a mandrel unit 340, a vacuum valve and an argon valve (not shown), a welding torch group 350, and a servo motor 360, and welds welded surfaces 3 (see FIG. 9b) of the tube 1 and the flange 2 supplied by the flange supplying unit 200.

As shown in FIG. 4b, the chamber side sealing unit 320 includes a metal ring 321 and an elastic ring 325. The metal ring 321 has through holes 322 formed radially on the outer circumferential surface thereof. The elastic ring 325 has a metal ring groove 326 formed on the outer circumferential surface thereof for inserting the metal ring 321 thereinto. As shown in FIG. 4c, the metal ring 321 is joined with the elastic ring 325 in such a way that the inner circumferential surface thereof is inserted into the metal ring groove 326. The chamber site sealing unit 320 is mounted inside the tube inlet 334 of the welding chamber 330 to thereby rotate with the tube 1 when the mandrel unit 340 is rotated.

The chamber side sealing unit 320 shield the inside of the welding chamber 330 from the outside since the elastic ring 325 expands and is in close contact with the tube 1 by pneumatic pressure of gas introduced from the metal ring groove 326 through the through holes 322 of the metal ring 321 after the tube 1 is inserted into the elastic ring 325.

The welding chamber 330, as shown in FIG. 4a, includes an accepting space 331 for accepting and welding the tube 1, a mandrel inlet 332 formed on a side opposed to the mandrel unit 340 of the accepting space 331, and a welding torch group inlet 333 formed on an upper face thereof opposed to the welding torch group 350 of the accepting space 331, and a tube inlet 334 formed on a side opposed to an end portion of the tube 1 of the accepting space 331. A mandrel guide 347 is mounted inside the accepting space 331 and has an outer diameter smaller than an inner diameter of the tube 1. One end portion of the mandrel guide 347 is on the same axis as the tube 1 through the tube inlet 334, and protrudes outwardly from the welding chamber 330. The mandrel guide 347 has at least one chuck hole 347a array formed radially on the outer circumferential surface opposed to the tube 1 and the flange 2 conveyed to a position to be welded. The mandrel guide 347 also includes a stopper face 344a whose outer diameter is increased at the left (in FIG. 4a) of a welding torch 351 to thereby stop the movement of the flange 2. When the movement of the flange 2 is stopped by the stopper face 344a, the welded surfaces 3 (see FIG. 9b) of the flange 2 and the tube 1 are located below the welding torch 351.

The tube inlet 334, the mandrel inlet 332 and the mandrel guide 347 are located on the same axis, so that the tube 1 is fixed to a mandrel 343 in such a way as to be rotated.

The welding torch group inlet 333 is formed on the upper portion of the welding chamber 330, which is at right angles to the welded surfaces 3 (see FIG. 9b) of the tube 1 and the flange 2.

The mandrel unit 340 is a device, which can rotate grasping the tube 1. As shown in FIG. 4a, a pneumatic cylinder 341 is connected with a connecting rod 342 via a joint below the mandrel unit 340, and a mandrel shaft 344 is connected to the connecting rod 342 to thereby move left and right (see FIG. 4a) inside the welding chamber 330 by the connecting rode 342. The mandrel shaft 344 has a mandrel shaft slope 345 formed on the outer circumferential surface opposed to the chuck hole 347a formed on the mandrel guide 347, whose outer diameter is gradually reduced toward the right (see FIG. 4a) in the region opposed to the chuck hole 347a. A mandrel chuck 346 having a slope, which is in contact with the mandrel shaft slope 345 in correspondence to the mandrel shaft slope 345, is mounted in the chuck hole 347a by the elastic ring 346a in such a way as to protrude outward from the mandrel guide 347. When the mandrel shaft 344 moves to the right, the mandrel chuck 346 protrudes outwardly from the mandrel guide 347 by the mandrel shaft slope 345 and fixes the flange 2 and the tube 1.

The vacuum valve (not shown) inhales the inside air of the sealed welding chamber 330 and the tube 1 to thereby make a vacuum condition. The argon valve supplies argon gas, which is an inert gas, into the welding chamber 330 to thereby make an inert atmosphere during TIG welding. The vacuum valve and the argon valve are not illustrated in the drawings as being the same as the prior arts.

The welding torch group 350, as shown in FIG. 4a, includes the welding torch 351, pneumatic cylinder 352, and a connecting rod 353.

Figure 9A:
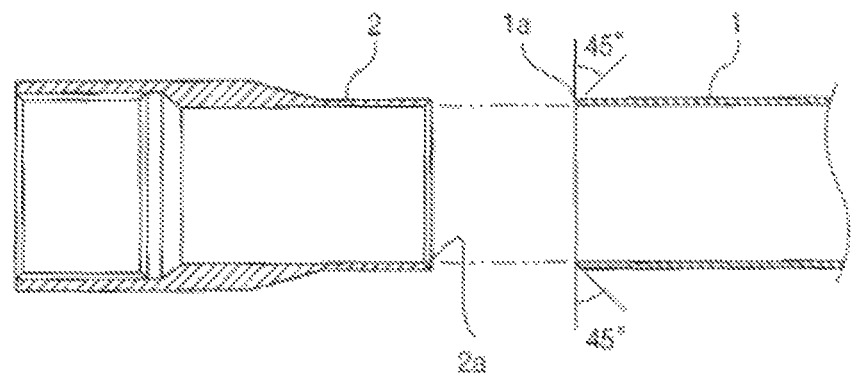
FIG. 9a is a sectional view showing a state before the flange 2 and the tube 1 are welded by butt welding.
Figure 9B:
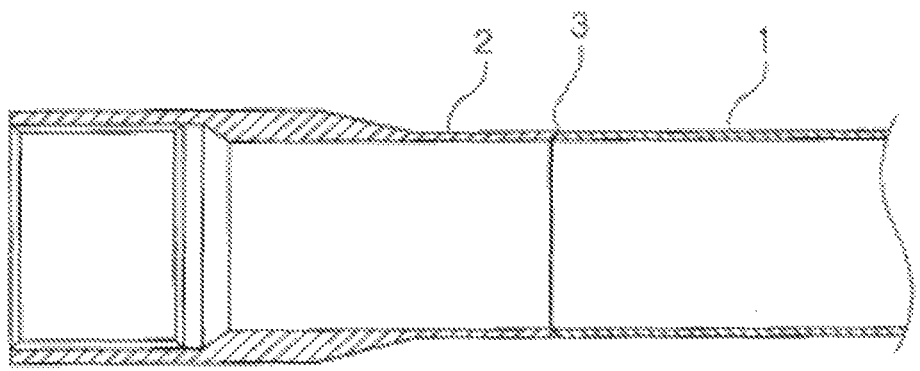
FIG. 9b is a sectional view a state after the flange 2 and the tube 1 are welded by butt welding.

The welding torch 351 is located on the welded surfaces 3 (see FIG. 9b) of the flange 2 and the tube 1 (see FIG. 9b). The pneumatic cylinder 352 is located on the welding torch 351 to provide a driving force to ascend and descend the welding torch 351. The connecting rod 353 connects the welding torch 351 and the pneumatic cylinder 352 with each other, so that the pneumatic cylinder 352 can ascend and descend the welding torch 351. The welding torch group 350 lowers the welding torch 351 in such a way that the welding torch 351 is adjacent to a welded portion of the flange 2 and the tube 1 when the flange 2 and the tube 1 are located inside the welding chamber 330.

The servo motor 360 is a general motor and is connected with the mandrel 343 by a timing belt 301 (see FIGS. 2a and 4a) to rotate the mandrel 343.

Figure 5:
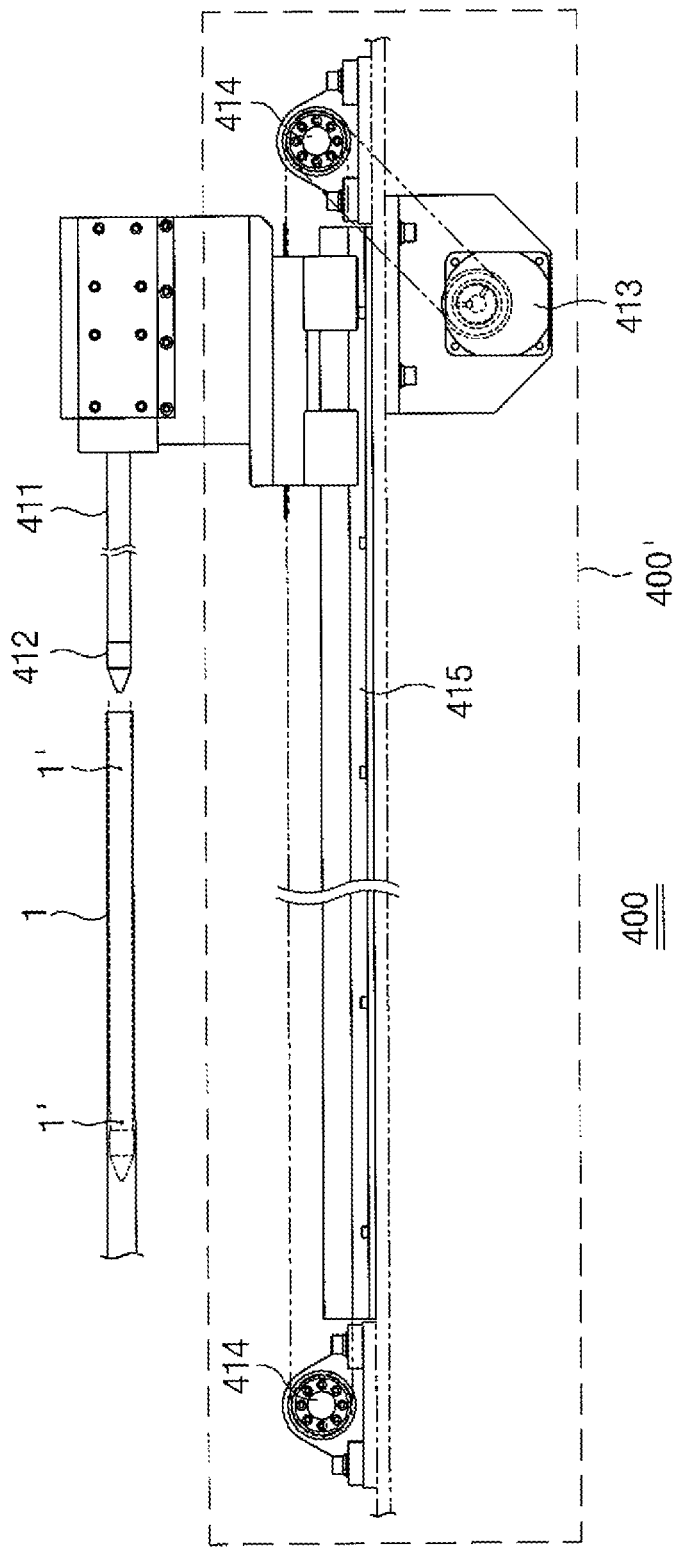
FIG. 5 is a front view of a stopper side sealing unit 400.

FIG. 5 is a front view of the stopper side sealing unit 400.

The stopper side sealing unit 400 is located oppositely to the welding chamber 330 on a basis of the tube 1. The stopper side sealing unit 400 includes a sealing bar 411 and a driving means 400'.

The sealing bar 411 is in the form of a long bar, on a left end of which a sealing ring 412 is mounted, and inserted into the tube 1. The driving means 400' includes a motor 413, a pulley 414 and a rail 415 mounted below the sealing bar 411. The stopper side sealing unit 400 can move back and forth along the rail 415 by the pulley 414 rotating by the motor 413 of the driving means 400'. When the stopper side sealing unit 400 moves forward, the sealing bar 411 is inserted into the tube 1 until the sealing ring 412 passes the left tube through hole 1'. The sealing ring 412 inserted into the tube 1 expands by pneumatic pressure and is in close contact with the inner surface of the tube 1, whereby the stopper side sealing unit 400 shields the inside of the tube from the outside.

The conveying unit 500 includes a laterally conveying unit 510 for moving the tube 1 in a lateral direction, which is perpendicular to the axial direction, and axially conveying unit 520, and 520' for moving the tube 1 axially.

Figure 6A:
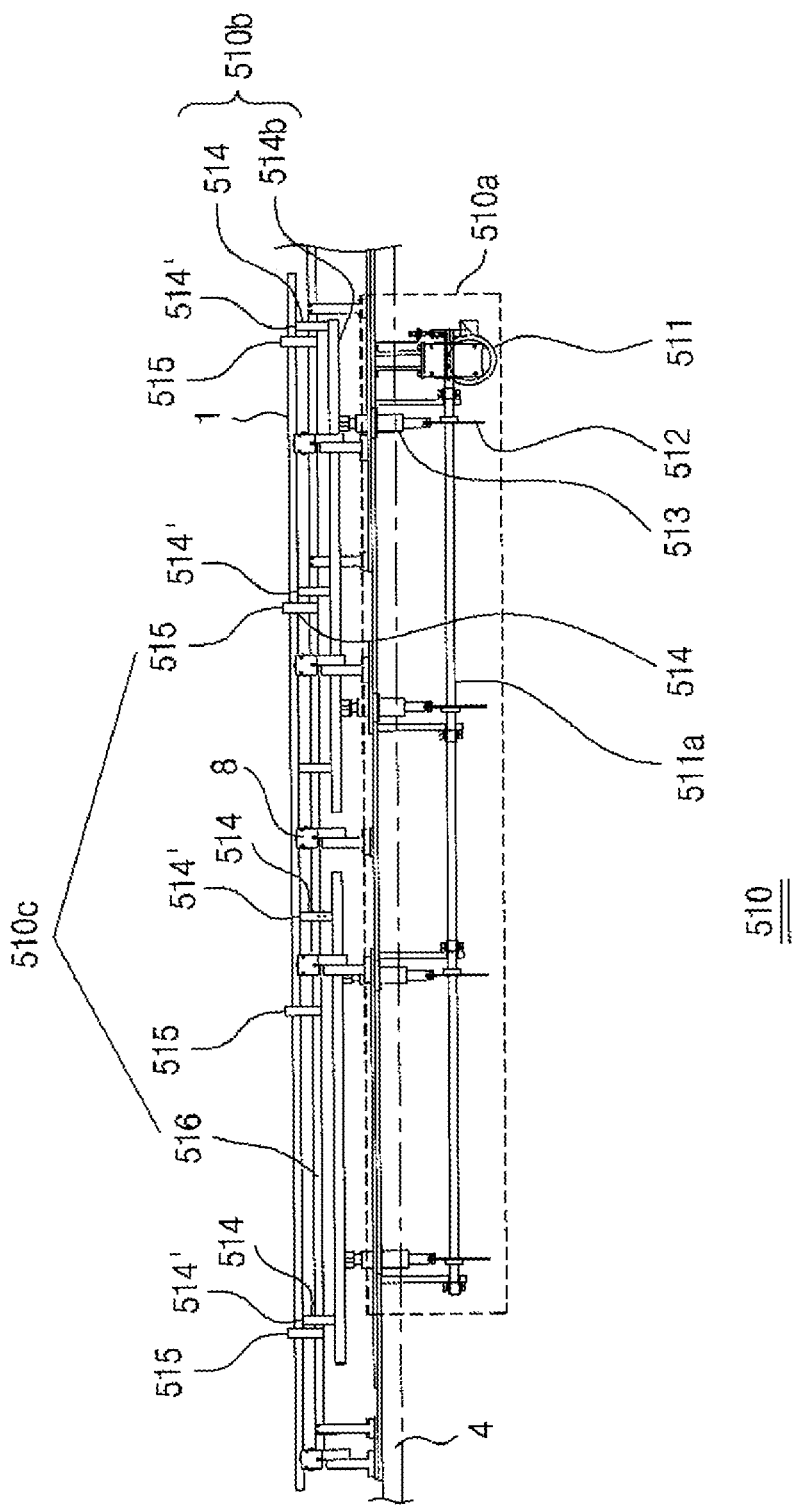
FIG. 6a is a schematic front view of the laterally conveying unit 510 of the conveying unit.
Figure 6B:
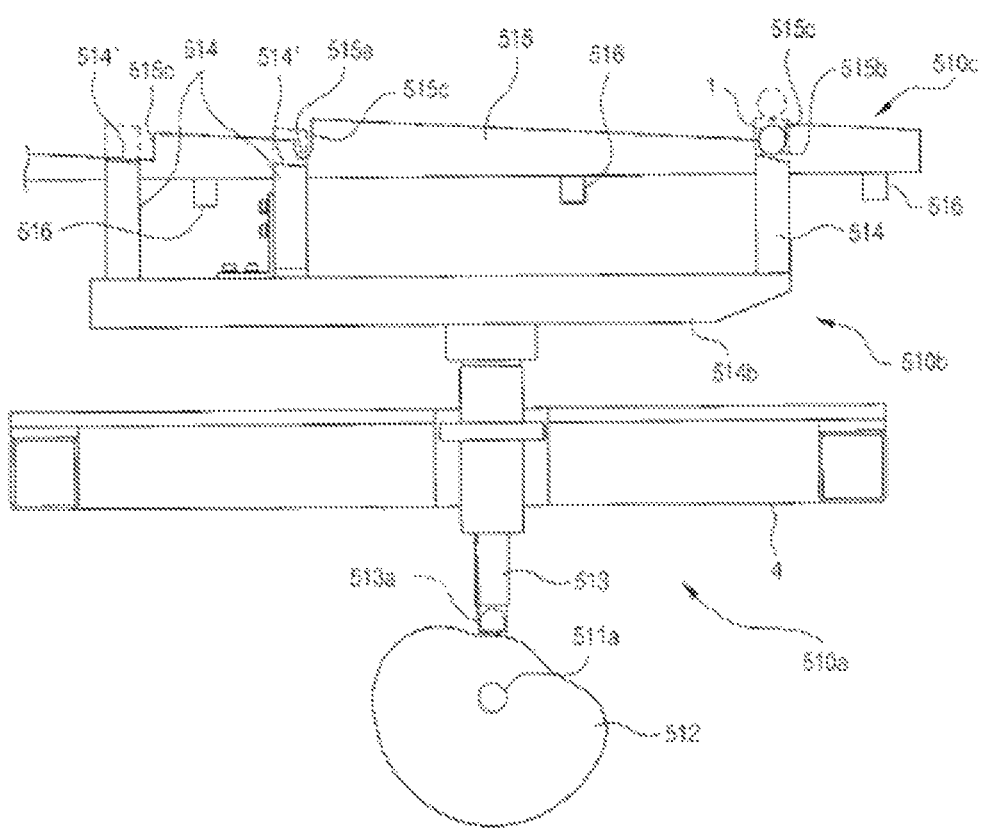
FIG. 6b is a schematic right side view of a part where a cam 512 of the laterally conveying unit is contained.

FIG. 6a is a schematic front view of the laterally conveying unit 510 of the conveying unit 500, and FIG. 6b is a schematic right side view of a part where a cam 512 of the laterally conveying unit 510 is contained.

As shown in FIGS. 6a and 6b, the laterally conveying unit 510 includes a cam unit 510a, a conveyable body 510b and a tube guide unit 510c.

The cam unit 510a includes a motor 511 (see FIG. 6a) mounted below the workbench 4 (see FIGS. 2a and 2b), at least one cam 512 connected to a driving shaft 511a of the motor 511, and a slave body 513 carried out a vertical reciprocating action by interlocking with the cam 512 in a state where it is in contact with the cam 512 by a roller 512a.

The conveyable body 510b includes a slave bar 514b and at least one block 514.

The slave bar 514b has the bottom fixed on the upper face of the slave body 513 and is carried out a vertical reciprocating action by the slave body 513.

The blocks 514 are disposed on the upper face of the slave bar 514b in rows, which corresponds to the axial conveying lines 7a and 7b (see FIG. 2a) where a welding position tube fixing hole 515a and a measuring position tube fixing hole 515b of the tube guide 515. The upper faces of the blocks 514 serve as upper slopes 514' (see. 6b) inclined in the lateral conveying direction.

The tube guide unit 510c includes at least one tube guide 515 and fixing shaft 516.

The tube guide 515 is at right angles to the tube 1, and is arranged along the axial direction of the tube 1 in plural number. As shown in FIG. 6b, on the upper face of the tube guide 515, the tube guide 515 includes the welding position tube fixing hole 515a for fixing the tube 1 at a welding position of the tube 1 and the flange 2, a measuring position tube fixing hole 515b for fixing the tube 1 at a measuring position related with a coaxial welding of the tube 1 and the flange 2, and a plurality of walls 515c for stopping the lateral movement of the tube 1. Spaces between the walls 515c are inclined along the movement direction of the tube 1.

The fixing shafts 516 are disposed below the tube 1 in such a way as to be separated at a predetermined interval in the lateral direction of the tube 1 to thereby fix and support the tube guides 515.

In the laterally conveying unit 510, the slave body 513 and the conveyable body 510b vertically move between the top dead center and the bottom dead center of the cam 512 by the cam 512 rotating by the rotation of the motor 511. The blocks 514 draw the tube 1 upwardly from the welding position tube fixing hole 515a when the conveyable body 510b ascends. The upwardly drawn tube 1 performs a rolling movement by the upper slopes 514' of the blocks 514 and the inclinations of the upper faces of the tube guides 515, and then, is inserted into the measuring position tube fixing hole 515b. In this instance, the walls 515c stop the rolling movement of the tube 1.

The tube guides 515 illustrated in FIG. 6b are just one example for the present invention. Shapes of the tube guides 515, formation locations and the number of the tube fixing holes 515a and 515b and the walls 515c may be changed according to the welded surface processing part (not shown), the inner diameter processing part (not shown), and so on.

Figure 7A:
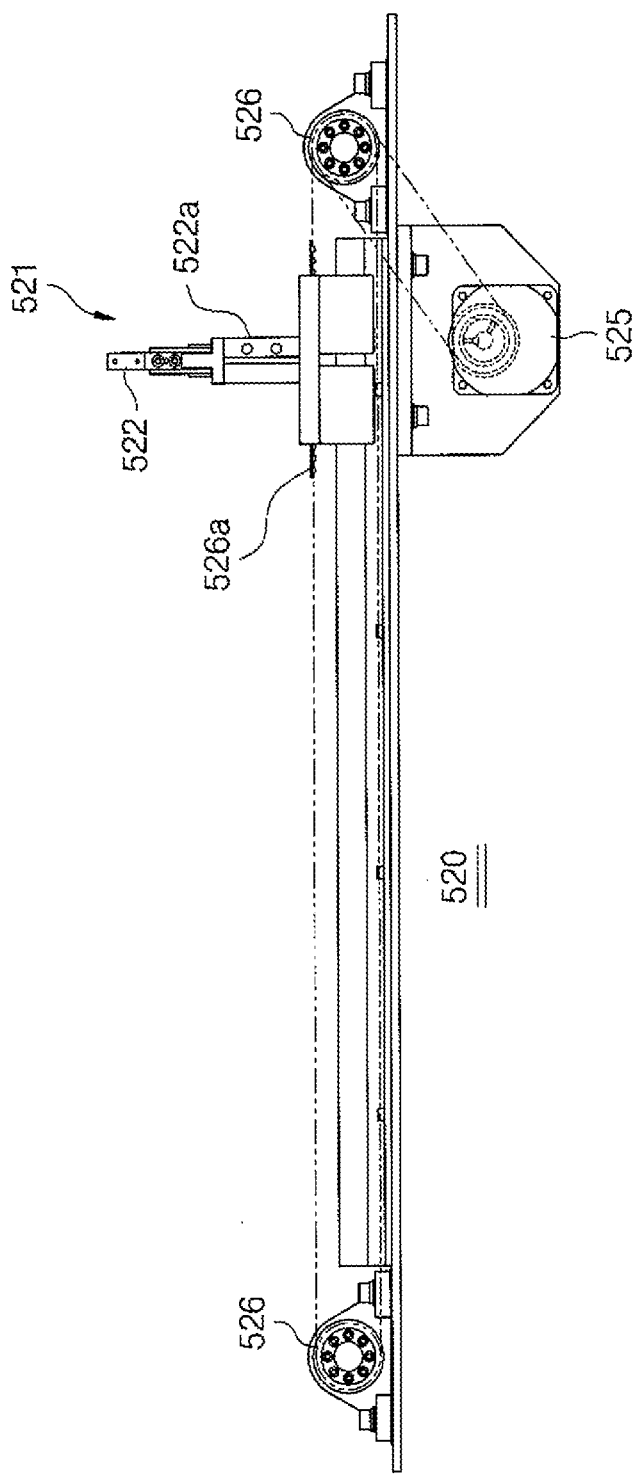
FIG. 7a is a front view of the axially conveying unit 520.
Figure 7B:
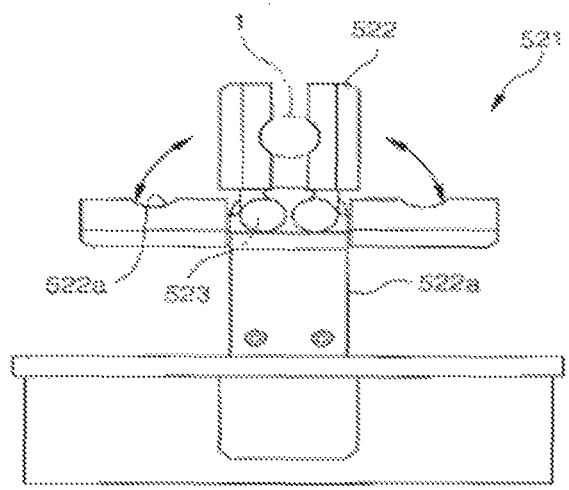
FIG. 7b is a side view of a gripper 521.

FIG. 7a is a front view of the axially conveying unit 520 (see FIG. 2a), and FIG. 7b is a side view of a gripper 521.

The axially conveying unit 520 includes the gripper 521, a pulley 526 located at both sides of the gripper 521, a belt 526a wound on the pulley 526, and a motor 525 for rotating the pulleys 526.

The gripper 521 includes right and left arms 522 joined with the upper portion of a gripper body 522a by a hinge 523, the right and left arms 522 rotating on the hinge 523 by pneumatic pressure to hold and fix the tube 1. The right and left arms 522 of the gripper 521 are configured in such a way as to move at the same time, so that they ascend and descend together. The arms 522 have a groove in which the tube 1 is inserted. While holding and fixing the tube 1 when they rotate and ascend at the same time, the right and left arms 522 release fixing of the tube 1 when they rotate and descend together.

The motor 525 and the pulleys 526 laterally convey the gripper 521 connected by the belt 526a along the axially conveying line 7a (see FIG. 2a), so that the tube 1 fixed to the gripper 521 is conveyed from the upper portion of a tube conveying roller 8 along the axially conveying line 7a.

Figure 7C:
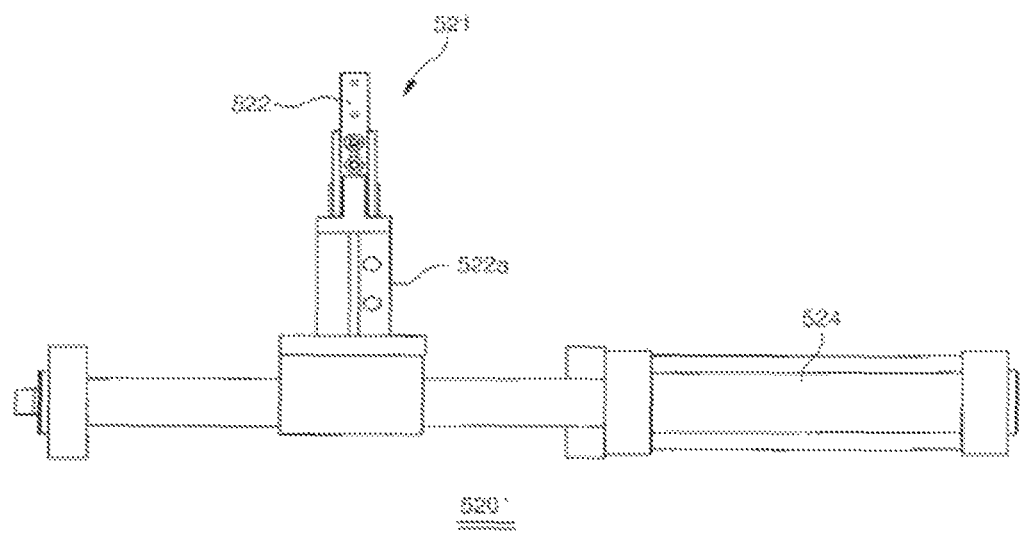
FIG. 7c is a front view of the axially conveying unit 520' actuated by a pneumatic cylinder.

FIG. 7c is a front view of an axially conveying unit 520' for conveying the gripper 521 on an extended axially conveying line 7b using a pneumatic cylinder 524.

In the axially conveying unit 520', the pneumatic cylinder 524 in place of the motor 525 and the pulleys 526 conveys the gripper 521 along the axially conveying line 7b (see FIG. 2a). The pneumatic cylinder 524 conveys the gripper 521 along the axially conveying line 7b of the tube 1.

The motor 525, the pulleys 526 and the belt 526a constituting the axially conveying unit 520 and the pneumatic cylinder 524 constituting the axially conveying unit 520' are one example of the gripper conveying unit for conveying the gripper 521.

The axially conveying unit 520 having the motor 525, the pulleys 526 and the belt 526a and the axially conveying unit 520' having the pneumatic cylinder 524 can be selectively applied in case of need.

The conveying unit 500 having the above-mentioned configuration is laterally aligned between other conveying unit (not shown) which are arranged at the welded surface processing part (not shown) and the inner diameter processing part (not shown). The conveying unit is continuously aligned in a laterally conveyable direction of the tube 1 according to the manufacturing process of the guide thimble tube, so that the conveying unit can continuously convey the tube 1 according to the position of the processing parts corresponding to the guide thimble tube manufacturing process. Thereby, welding of the flange 2 and the tube 1 constituting the guide thimble tube can be carried out automatically.

As shown in FIG. 2a, the conveying direction of the tube 1 of the laterally conveying unit 510 is at right angles to the axially conveying lines 7a and 7b, and arranged at regular intervals in plural number. As shown in FIG. 2a, the axially conveying unit 520 and 520' are respectively arranged on the axially conveying lines 7a and 7b of the tube 1 to form the conveying unit 500. In FIG. 2a, the reference numeral 7a designates the axially conveying line extending to the welding unit 300 and 7b designates the axially conveying line extending to the tremor measuring part 700.

Figure 8A:
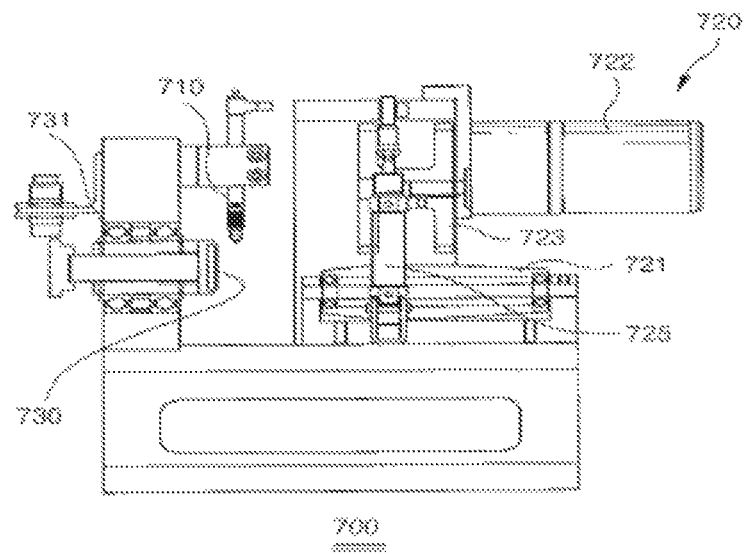
FIG. 8a is a front view of the tremor measuring part 700.
Figure 8B:
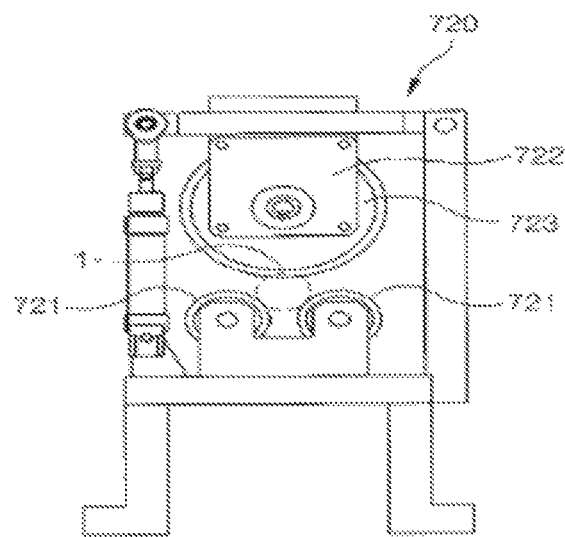
FIG. 8b is a right side view of a tube rotator 720.

FIG. 8a is a front view of the tremor measuring part 700, and FIG. 8b is a right side view of a tube rotator 720.

As shown in FIG. 8a, the tremor measuring part 700 includes a probe 710 for inspecting a change in height of the outside of the flange 2 according to the rotation of the tube 1 in a state where it is in contact with the outer surface of the flange 2, a stopper 730 rotating below the probe 710 together with the tube 1 after stopping the axial conveyance of the tube 1, and a tube rotator located at right side of the probe 710 for rotating the tube 1.

The stopper 730 is rotatably mounted on the axially conveying line of the tube 1 beneath the probe 710 by a bearing 731. The stopper 730 stops the axial conveyance of the tube 1 in a state where an end portion of the flange 2 welded to the tube 1 is in contact with the stopper 730. When the tube 1 is rotated by the tube rotator 720, the stopper 730 rotates together with the tube 1 by the bearing 731.

The tube rotator 720 includes a motor 722, an upper roller 723 rotating in a state where it is in contact with the upper face of the tube 1 by the motor 722, a pair of lower rollers 721 adapted for supporting the tube 1 below the upper roller 723 and rotated by the rotation of the tube 1, and a conveying cylinder 725 for vertically moving the motor 722 joined with the upper roller 723.

The indication part 5 (see FIG. 2*b*) is to indicate a welded status of the flange 2 and tube 1 and a vertical movement width of the rotation of the flange 2 measured by the tremor measuring part 700.

The controlling part 6 (see FIG. 2*b*) is configured to control operations of components of the automatic welding apparatus 100 including the welding unit 300, the stopper side sealing unit 400, the conveying unit 500, and the tremor measuring part 700. The controlling part 6 can sense a movement of the tube 1 by program, and then, automatically carry out a welding process of the flange 2 and the tube 1. Furthermore, alternatively, the controlling part 6 may include a plurality of control buttons, and so, the automatic welding apparatus 100 can carry out the welding process of the flange 2 and the tube 2 by a user's button manipulation according to a conveyed position of the tube 1.

The end surface 1*a* (see FIG. 9*a*) of the tube 1 and the end surface 2*a* (see FIG. 9*a*) of the flange 2, which form the welded surface 3 (see FIG. 9*b*) of the tube 1 and the flange 2 can be processed in such a way as to complementarily interlock with each other in order to prevent a separation from each other during the rotation for butt welding.

FIG. 9*a* is a sectional view showing a state before the flange 2 and the tube 1 are welded by butt welding, and FIG. 9*b* is a sectional view a state after the flange 2 and the tube 1 are welded by butt welding.

As shown in FIG. 9*a*, the end surface 1*a* of the tube 1 is processed in such a way that an outer diameter thereof has a sweep-back angle of 45°, and the end surface 2*a* of the flange 2 is processed in such a way that an outer diameter thereof has a sweep forward angle of 45°, whereby the end surfaces 1*a* and 2*a* of the tube 1 and the flange 2 form the welded surface 3 as shown in FIG. 9*b* and are joined with each other in such a way that their outer diameters engage with each other. Accordingly, since the outer diameters of the tube 1 and the flange 2 engage with each other without any pressing work, it is prevented that the tube 1 and the flange 2 are separated from each other on the same axis during the rotation for welding.

Processing of the end surfaces 1*a* and 2*a* of the tube and the flange 2 is carried out by the welded surface processing part (not shown) mounted at one side of the automatic welding apparatus 100.

Hereinafter, referring to FIGS. 2*a* to 9*b*, a method of automatically welding a flange to a guide thimble tube in a nuclear fuel assembly using the automatic welding apparatus 100 will be described.

The method of automatically welding the flange to the guide thimble tube in the nuclear fuel assembly according to the present invention includes the steps of: supplying the flange 2; inserting the flange 2 into the welding chamber 330 after the tube 1 is interlockingly joined to the flange 2; sealing the inside of the welding chamber 330 to which the flange 2 and the tube 1 are inserted and the inside of the tube 1 from the outside; welding end surfaces of the flange 2 and the tube 1 into one welded surface 3 while fixing and rotating the flange 2 and the tube 1 after filling argon atmospheric gas after the sealing step; transferring the tube 1, to which the flange 2 is welded, to the conveying unit 500; laterally conveying the tube 1 transferred to the conveying unit 500 to the tremor measuring part 700; and measuring tremor in order to judge whether or not the flange 2 has been welded to the tube 1 on the same axis within an error tolerance while rotating the flange 2 and the tube 1 after mounting them to the tremor measuring part 700.

Through the flange supplying step, the flange supplying unit 200 discharges the flange 2, and the flange 2 is supplied coaxially with the tube 1 by conveying the conveying block 230 in the axial direction of the tube 1 as shown in FIG. 3.

In order to insert the flange 2 and the tube 1 into the welding chamber 230, the tube 1 is conveyed to the upper face of the tube guide 515 of the conveying unit 500, which is mounted to interlock with the automatic welding apparatus 100, by the conveying unit (not shown) interlocking with the welded surface processing part (not shown). The tube 1 conveyed to the upper face of the tube guide 515 is inserted into the welding position tube fixing hole 515*a* after a rolling movement in a lateral direction by the inclined upper face of the tube guide 515.

The tube 1 seated on the welding position tube fixing hole 515*a* of the conveying unit 500 is fixed by the arms 522 formed on the gripper 521 of the axially conveying unit 520, and then, axially conveyed toward the welding unit 300 by the gripper conveying unit including the motor 525, the pulleys 526 and the belt 526*a* or including the pneumatic cylinder 524 (see FIG. 7*a* or 7*c*).

The tube 1 conveyed axially is interlockingly joined with the flange 2 located on the conveying block 230 as shown in FIG. 9*b*.

The flange 2 and the tube 1, which are joined interlockingly with each other, are continuously conveyed by the axially conveying unit 520, inserted into the outer circumference of the mandrel guide 347, and then, inserted into the welding chamber 330 (see FIG. 4*a*).

The flange 2 and the tube 1 inserted into the welding chamber 330 stops the axial conveyance while the flange 2 is in contact with the stopper face 344*a* (see FIG. 4*a*). In this instance, the welded surfaces 3 of the flange 2 and the tube 1 (see FIGS. 4*a* and 9*b*) are located below the welding torch 351.

After that, the mandrel shaft 344 moves toward the flange 2 and the tube 1 by an action of the pneumatic cylinder 341 of the mandrel unit 340, and then is inserted into the flange 2 and the tube 1. When the mandrel shaft 344 is inserted into the flange 2 and the tube 1, the mandrel shaft slopes 345 jut the protruding chucks 346 in a circumferential direction of the mandrel guide 347 through the chuck holes 346*a* to thereby fix the flange 2 and the tube 1.

After the flange 2 and the tube 1 are fixed by the mandrel shaft 344, by the above-mentioned sealing step, the elastic ring 325 of the chamber side sealing unit 320 (see FIGS. 4*a* to 4*c*) expands in a central direction by pneumatic pressure to thereby shield the outer circumferential surface of the tube 1 from the tube inlet 334. At the end portion of the tube 1, which is located outside the welding chamber 330, the sealing bar 411 of the stopper side sealing unit 400 (see FIG. 5) is inserted to the inside of the tube 1 passing through the tube through hole 1', and then, the sealing ring 412 expands by the pneumatic pressure to thereby shield the inside of the tube 1 from the outside, whereby it is prevented that the external air containing oxygen is introduced to the inside of the welding chamber 330. In the above state, if a vacuum valve (not shown) and an argon valve (not shown) are used, inert gas, such as argon gas, fills the inside of the welding chamber 330 as the same time when the inside air of the welding chamber 330 is discharged, whereby chemical deformations of the tube 1 and the flange 2 by oxidation during welding can be prevented.

When filling of inert gas into the welding chamber 330 is finished, by the welding step, the servo motor 360 and the timing belt 301 rotate the mandrel 343 and mandrel shaft 344, which fixes the flange 2 and the tube 1. While the mandrel rotates, the welding torch 351 lowers in such a way as to be adjacent to the welded surfaces 3 (see FIG. 9b) of the flange 2 and the tube 1, and then, the welded surfaces 3 are welded.

After the welding of the flange 2 and the tube 1 is finished, the sealing of the chamber side sealing unit 320 and the sealing of the stopper side sealing unit 400 are released, and fixation of the flange 2 and the tube 1 by the mandrel shaft 344 is also released, and then, the mandrel shaft 344 is returned to its original position. The tube 1 to which the unfixed flange 2 is welded is conveyed to the conveying unit 500 by the axially conveying unit 520 (see FIG. 2a and FIGS. 7a to 7c).

After that, the laterally conveying unit 510 laterally conveys the tube 1 conveyed to the conveying unit 500, so that the tube 1 is located in the measuring position tube fixing hole 515b.

Next, the tube 1 located on the measuring position tube fixing hole 515b is conveyed to the tremor measuring part 700 by the axially conveying unit 520' (see FIGS. 2a and 7c) mounted axially. The tube 1 conveyed by the axially conveying unit 520' stops the axial conveyance if the flange 2 is in contact with the stopper 730 (see FIG. 8a). In this instance, the flange 2 is located beneath the probe 710, and the end portion of the tube 1 welded with the flange 2 is located between the upper roller 723 and a pair of the lower rollers 721.

When the end portion of the tube 1 welded with the flange 2 is located between the upper roller 723 and a pair of the lower rollers 721, the motor 722 is moved downwardly by the conveying cylinder 725, and the tube 1 is fixed by the upper roller 723 and the lower rollers 721. After that, the probe 710 is moved downwardly by pneumatic pressure, and then, is in contact with the outer surface of the flange 2.

After the probe 710 is in contact with the flange 2 and the tube 1 is fixed between the upper roller 723 and the lower rollers 721, the upper roller 723 is rotated by the motor 722 to thereby rotate the stopper 730, the flange 2 and the tube 1.

The probe 710 is in contact with the outer surface of the flange 2 and outputs a vertical movement width of the outer surface of the flange 2 by the rotation of the tube 1 to an external indicator (not shown). Through changes of the vertical movement width during the rotation of the flange 2, the user can inspect whether or not the tube 1 and the flange 2 are welded on the same axis within the error tolerance. In this instance, if the vertical movement width (tremor) of the flange 2 is within the error tolerance, the next step will be carried out, but if the vertical movement width exceeds the error tolerance, the step is stopped.

When the flange 2 is welded on the same axis with the tube 1 within the error tolerance, the tube 1 is located at the center of the conveying unit 500 by the axially conveying unit 520' (see FIG. 2a). After that, the tube 1 is automatically conveyed to the inner diameter processing part (not shown) by the laterally conveying unit 510. The inner diameter processing part is a device to make a portion, which protrudes on the inner welded surfaces 3 of the flange 2 and the tube 1 by welding, flat.

Through the above-mentioned steps, the automatic welding apparatus 100 according to the present invention can automatically weld and join the tube 1 and the flange 2, which form the guide thimble tube. In the above steps, operations of the flange supplying unit 200, the chamber side sealing unit 320, the welding torch group 350, the stopper side sealing unit 400 and the conveying unit 500 are controlled by the controlling part 6.

While the present invention has been described with reference to the particular illustrative embodiment, it is not to be restricted by the embodiment but only by the appended claims.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for welding a flange to a tube using an apparatus which includes
    a welding unit located on an axially conveying line to carry the tube for welding a surface of the tube inserted thereinto and a surface of the flange, the welding unit including a mandrel unit and a welding torch group,
    a flange supplying unit for supplying the flange at a tube inlet of a welding chamber onto the axially conveying line,
    wherein the flange supplying unit comprises:
    a magazine vertically perforated, on which a plurality of the flanges are piled up;
    a stopper located beneath the magazine to discharge the flanges one by one;
    conveying blocks for seating the discharged flanges thereon; and
    a pneumatic cylinder for moving the conveying blocks in order to locate the flanges on the axially conveying line of the tube
    a conveying unit mounted on the axially conveying line in such a way as to move the tube and the flange on the axially conveying line, so that the tube and the flange are inserted into and drawn from the welding unit, and
    a controlling unit for controlling the apparatus,
    the method comprising:
    supplying the flange, by the flange supplying unit, onto the axially conveying line on which the welding unit is mounted;
    conveying the tube, by the conveying unit, toward the welding unit along the axially conveying line;
    joining an end of the flange to an end of the tube;
    inserting at least the joined portion of the flange and the guide thimble tube into the welding chamber;
    welding the joined portion by the welding torch group while the mandrel unit rotates the flange and the tube;
    drawing out the tube and the flange from the welding chamber; and
    laterally conveying the tube and the flange drawn-out from the welding chamber.

2. The method according to claim 1, further comprising:
    sealing the welding chamber from an outside by a chamber side sealing unit and a stopper side sealing unit,
    wherein the chamber side sealing unit is mounted in the tube inlet of the welding chamber and seals the welding chamber by contacting with an outer circumferential surface of the tube inserted into the welding chamber, and the stopper side sealing unit is mounted in the other end side of the tube inserted into the welding chamber and seals the welding chamber by sealing the other end of the tube.

3. The method according to claim 1, further comprising:
    measuring a vibration width of the flange by a tremor measuring unit to inspect a welded status of the flange and the tube while the flange and the tube are rotated, wherein the tremor measuring unit is mounted on the axially conveying.

* * * * *